(12) United States Patent
Saeki et al.

(10) Patent No.: US 8,758,147 B2
(45) Date of Patent: Jun. 24, 2014

(54) TORQUE FLUCTUATION ABSORBER

(75) Inventors: Tomohiro Saeki, Anjo (JP); Yusaku Nishio, Chiryu (JP); Hiroaki Suezaki, Anjo (JP); Hiroshi Kawazoe, Kariya (JP); Tsutomu Sekine, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/554,174

(22) Filed: Jul. 20, 2012

(65) Prior Publication Data
US 2013/0029771 A1    Jan. 31, 2013

(30) Foreign Application Priority Data

Jul. 25, 2011    (JP) .................................. 2011-161730

(51) Int. Cl.
*F16D 7/02*    (2006.01)

(52) U.S. Cl.
USPC ......................................... 464/46; 192/70.17

(58) Field of Classification Search
USPC .................. 464/45–48; 192/56.1, 56.6, 70.17
See application file for complete search history.

(56) References Cited

U.S. PATENT DOCUMENTS

| 2,140,723 | A  | * | 12/1938 | Spicer ......................... 464/48 X |
| 2,501,096 | A  | * | 3/1950  | Robins et al. ............... 464/46 X |
| 6,776,718 | B2 | * | 8/2004  | Tu .................................... 464/46 |
| 2010/0224459 | A1 | | 9/2010 | Saeki et al. |

FOREIGN PATENT DOCUMENTS

JP    2010-230162 A    10/2010

* cited by examiner

*Primary Examiner* — Gregory Binda
(74) *Attorney, Agent, or Firm* — Buchanan Ingersoll & Rooney PC

(57) ABSTRACT

A torque fluctuation absorber includes a first plate member being rotatable, a second plate member positioned to be axially separated from the first plate member, the second plate member being rotatable relative to the first plate member, a first friction member arranged between the first plate member and the second plate member and slidably pressed against the first plate member and the second plate member, and a first guide portion restricting the first friction member from moving radially inwardly.

15 Claims, 14 Drawing Sheets

F I G. 1 1
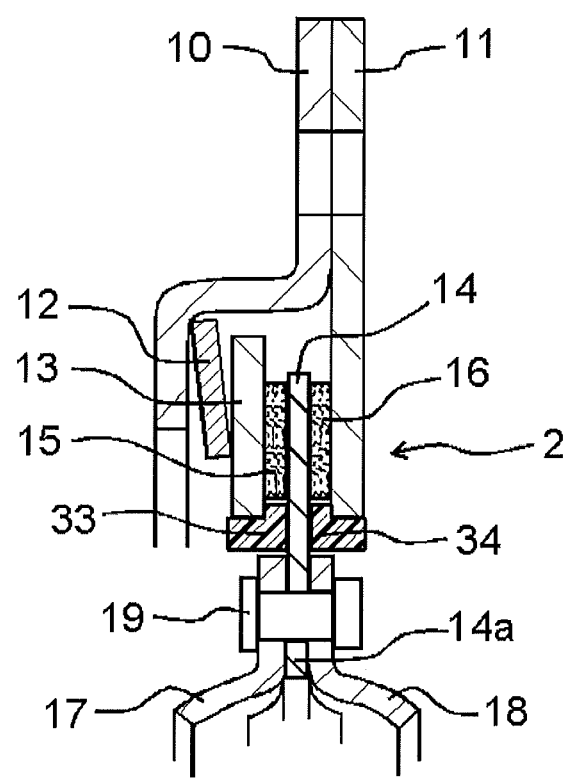

TORQUE FLUCTUATION ABSORBER

CROSS REFERENCE TO RELATED APPLICATIONS

This application is based on and claims priority under 35 U.S.C. §119 to Japanese Patent Application 2011-161730, filed on Jul. 25, 2011, the entire content of which is incorporated herein by reference.

TECHNICAL FIELD

This disclosure generally relates to a torque fluctuation absorber, which absorbs torque fluctuations generated between rotational shafts. In particular, the disclosure pertains to the torque fluctuation absorber including a limiter portion generating slippage when a fluctuating torque reaches a predetermined value.

BACKGROUND DISCUSSION

A known torque fluctuation absorber is provided, for example, on a drivetrain between an engine and a transmission. The known torque fluctuation absorber absorbs (restrains) torque fluctuations generated between the engine and the transmission. The known torque fluctuation absorber includes a damper portion that absorbs (restrains) the torque fluctuations by means of a spring force, a hysteresis portion that absorbs (restrains) the torque fluctuations by means of a hysteresis torque due to friction, and a limiter portion that generates slippage when torsion generated between a rotational shaft of the engine and a rotational shaft (an input shaft) of the transmission may not be absorbed by the damper portion and the hysteresis portion.

A known torque fluctuation absorber is disclosed in JP2010-230162A (which will be hereinafter referred to as Reference 1). In a limiter portion of the torque fluctuation absorber of Reference 1, a lining plate is arranged via first and second friction members between a cover plate and a pressure plate. The first friction member is slidably pressed against the cover plate and the lining plate and the second friction member is slidably pressed against the pressure plate and the lining plate (i.e., both surfaces of the first friction member, which face toward an engine and a transmission, respectively, are slidably pressed against the cover plate and the lining plate and both surfaces of the second friction member, which face toward the engine and the transmission, respectively, are slidably pressed against the pressure plate and the lining plate). According to such configuration of the limiter portion, the first friction member and the second friction member may move radially. Therefore, the first friction member and the second friction member are formed into annular shapes. Additionally, guide portions for restricting the first friction member and the second friction member from moving radially are arranged at the cover plate and the pressure plate (see FIG. 1 of Reference 1) or are arranged at the lining plate (see FIG. 2 of Reference 1).

According to the torque fluctuation absorber of Reference 1, the guide portions for restricting the first friction member and the second friction member from moving radially are arranged only at radially outward sides of the first friction member and the second friction member. Therefore, for example, the first friction member may move radially inwardly beyond or within an area sandwiched between the lining plate and the cover plate, or the second friction member may move radially inwardly beyond or within an area sandwiched between the lining plate and the pressure plate. In such case, characteristics of the limiter portion of the torque fluctuation absorber may vary.

A need thus exists for a torque fluctuation absorber which is not susceptible to the drawback mentioned above.

SUMMARY

According to an aspect of this disclosure, a torque fluctuation absorber includes a first plate member being rotatable, a second plate member positioned to be axially separated from the first plate member, the second plate member being rotatable relative to the first plate member, a first friction member arranged between the first plate member and the second plate member and slidably pressed against the first plate member and the second plate member, and a first guide portion restricting the first friction member from moving radially inwardly.

BRIEF DESCRIPTION OF THE DRAWINGS

The foregoing and additional features and characteristics of this disclosure will become more apparent from the following detailed description considered with the reference to the accompanying drawings, wherein:

FIG. 11 is an enlarged sectional view schematically illustrating a configuration of the limiter portion of the torque fluctuation absorber according to a ninth embodiment disclosed here;

DETAILED DESCRIPTION

A torque fluctuation absorber 1 according to a first embodiment of this disclosure will be explained as follows with reference to the illustrations of FIGS. 1 to 3.

The torque fluctuation absorber 1 according to the first embodiment is provided, for example, on a drivetrain between a crankshaft (an output shaft corresponding to a rotational shaft) of an engine (an internal combustion engine) and an input shaft (corresponding to a rotational shaft) of a transmission. The torque fluctuation absorber 1 absorbs (restrains) torque fluctuations caused by torsion between the rotational shafts (between the crankshaft and the input shaft). As illustrated in FIG. 2, the torque fluctuation absorber 1 includes a damper portion 3, a hysteresis portion 4, and a limiter portion 2. The damper portion 3 has a torsion buffering function to absorb the torque fluctuations generated between the rotational shafts, by means of an elastic force, for example, a spring force. The hysteresis portion 4 absorbs (restrains) the torque fluctuations by means of a hysteresis torque (for example, a frictional force). In a case where the torque fluctuations are beyond the absorption capabilities of the damper portion 3 and the hysteresis portion 4, the limiter portion 2 generates slippage when torque of the engine is larger than a predetermined torque. The damper portion 3 is arranged in parallel with the hysteresis portion 4 on the drivetrain. The limiter portion 2 is arranged in series with the damper portion 3 and the hysteresis portion 4.

Figure 2:
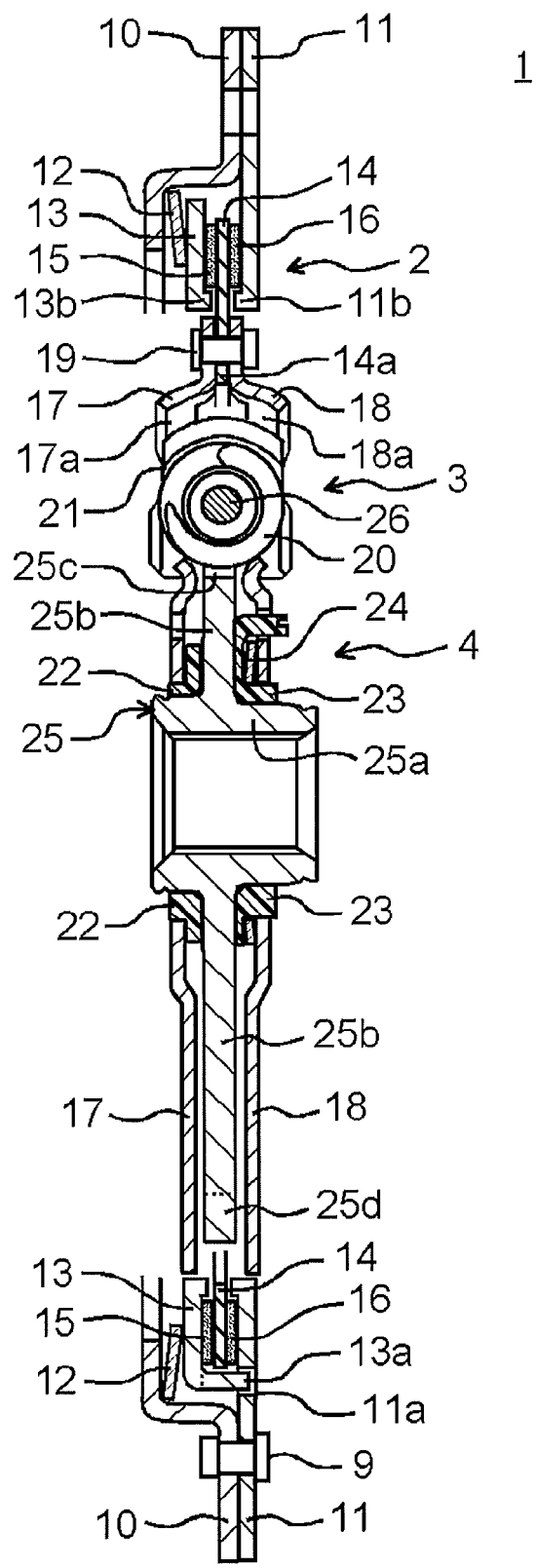
FIG. 2 is a cross-sectional view taken along the line II-II in FIG. 1.
Figure 3:
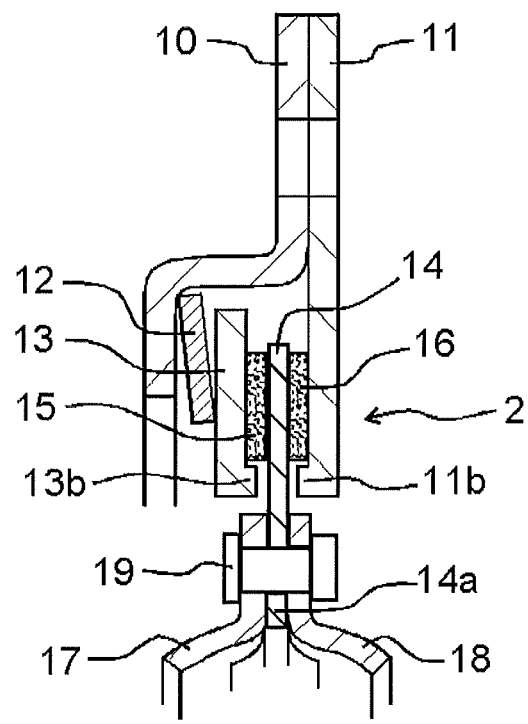
FIG. 3 is an enlarged sectional view schematically illustrating a configuration of a limiter portion of the torque fluctuation absorber according to the first embodiment disclosed here.

As illustrated in FIG. 2, the torque fluctuation absorber 1 includes rivets 9, a support plate 10, a cover plate 11 (a first plate member), a disc spring 12, a pressure plate 13 (a fourth plate), a lining plate 14 (a second plate member), friction members 16 and 15 having annular shapes and serving as first and second friction members, a first side plate 17 (a fifth plate member), a second side plate 18 (a third plate member), rivets 19, coil springs 20, seat members 21, a first thrust member 22, a second thrust member 23, a disc spring 24, a hub member 25, and cushion members 26.

The rivets 9 are connecting members to integrally fix the support plate 10 and the cover plate 11 to each other.

The support plate 10 having an annular shape supports an outer circumferential end portion of the disc spring 12. The support plate 10 is a component of the limiter portion 2. An outer circumferential portion of the support plate 10 is integrally fixed to an outer circumferential portion of the cover plate 11 by the rivets 9 in an overlapping manner (see FIG. 2). The support plate 10 and the cover plate 11 are attached and fixed to a flywheel connected to the crankshaft of the engine by a bolt. The support plate 10 integrally rotates with the flywheel and the cover plate 11. An inner circumferential portion of the support plate 10 is positioned away from the cover plate 11 while facing toward the transmission (the right side in FIG. 2) The outer circumferential end portion of the disc spring 12 is pressed against the support plate 10.

The cover plate 11 serving as the first plate member is an annular member to cover the limiter portion 2. The cover plate 11 is a component of the limiter portion 2. The outer circumferential portion of the cover plate 11 is integrally fixed to the outer circumferential portion of the support plate 10 by the rivets 9 in an overlapping manner (see FIG. 2). The cover plate 11 and the support plate 10 are attached and fixed to the flywheel connected to the crankshaft of the engine by the bolt. An inner circumferential portion of the cover plate 11 is positioned away from the support plate 10 in the axial direction. The cover plate 11 includes a bore portion 11a by which the pressure plate 13 is supported so as not to rotate and so as to move in the axial direction. A convex portion 13a of the pressure plate 13 is inserted in the bore portion 11a so as not to move circumferentially and so as to move in the axial direction. The inner circumferential portion of the cover plate 11 is slidably pressed against the friction member 16. The cover plate 11 includes a guide portion 11b serving as a first guide portion. An inner circumferential end portion of the cover plate 11 is bent toward the lining plate 14, thereby forming the guide portion 11b (see FIG. 3). The guide portion 11b restricts the annular friction member 16 from moving radially, thereby guiding the friction member 16 not to move radially inwardly beyond the cover plate 11. The guide portion 11b is formed continuously circumferentially at the cover plate 11. Alternatively, the guide portion 11b may be formed partially circumferentially at the cover plate 11. It is appropriate for the cover plate 11 to be made of metal (for example, stainless steel that does not easily rust compared to iron) in order to restrict the cover plate 11 from sticking to the friction member 16 because of an occurrence of rust on the cover plate 11.

As illustrated in FIG. 2, the disc spring 12 is arranged between the support plate 10 and the pressure plate 13. The disc spring 12 having an approximately conical shape is a component of the limiter portion 2. The outer circumferential end portion of the disc spring 12 is supported by the support plate 10 while the inner circumferential end portion of the disc spring 12 biases the pressure plate 13 toward the cover plate 11.

As illustrated in FIG. 2, the pressure plate 13 serving as the fourth plate member is an annular member arranged between the disc spring 12 and the friction member 15. The pressure plate 13 is a component of the limiter portion 2. The pressure plate 13 is positioned on the opposite side of the lining plate 14 from the cover plate 11 in the axial direction and is separated from the lining plate 14 in the axial direction. The pressure plate 13 integrally rotates with the cover plate 11 and rotates relative to the lining plate 14. The pressure plate 13 includes the convex portion 13a by which the pressure plate 13 is supported so as not to rotate relative to the support plate 10 and so as to move in the axial direction. The convex portion 13a is inserted in the bore portion 11a of the cover plate 11 so as not to move circumferentially and so as to move in the axial direction. The pressure plate 13 is biased toward the friction member 15 by the disc spring 12. The pressure plate 13 is slidably pressed against the friction member 15. The pressure plate 13 includes a guide portion 13b serving as a second guide portion. An inner circumferential end portion of the pressure plate 13 is bent toward the lining plate 14, thereby forming the guide portion 13b (see FIG. 3). The guide portion 13b restricts the annular friction member 15 from moving radially, thereby guiding the friction member 15 not to move radially inwardly beyond the pressure plate 13. The guide portion 13b is circumferentially continuously formed at the pressure plate 13. Alternatively, the guide portion 13b may be partially circumferentially formed at the pressure plate 13. It is appropriate for the pressure plate 13 to be made of metal (for example, stainless steel that does not easily rust compared to iron) in order to prevent the pressure plate 13 from sticking to the friction member 15 because of an occurrence of rust on the pressure plate 13.

As illustrated in FIG. 2, the lining plate 14 serving as the second plate member is positioned to be separated from the cover plate 11 in the axial direction. The lining plate 14 rotatable relative to the cover plate 11 is an annular member arranged between the friction member 15 and the friction member 16 that are positioned between the pressure plate 13 and the cover plate 11. The lining plate 14 is a component of the limiter portion 2. As illustrated in FIG. 1, the lining plate 14 includes multiple stopper portions 14a. The multiple stopper portions 14a are arranged at an inner circumferential portion of the lining plate 14 so as to extend radially inwardly. The stopper portions 14a restrain torsion, which is generated at the damper portion 3, within a predetermined angle. In particular, in a case where the torsion is generated at the damper portion 3, the stopper portions 14a make contact with stopper portions 25d of the hub member 25, thereby absorbing and restricting the torsion of the damper portion 3. The stopper portions 14a are sandwiched between the first side plate 17 and the second side plate 18 and are integrally fixed to the first side plate 17 and the second side plate 18 by the rivets 19. An outer circumferential portion of the lining plate 14 is arranged between the friction member 15 and the friction member 16 and the lining plate 14 is slidably pressed against the friction member 15 and the friction member 16. An outer circumferential end portion of the lining plate 14 is arranged at a radially inward side of the convex portion 13a of the pressure plate 13. In a case where the lining plate 14 is coaxially positioned with the friction member 15 and the friction member 16, a radial distance defined between an outer circumferential end surface of the lining plate 14 and an outer circumferential end surface of the friction member 15 is designed to be longer than a radial distance of a clearance defined between the guide portion 13b and an inner circumferential end surface of the friction member 15 (see FIG. 3). In addition, a radial distance defined between the outer circumferential end surface of the lining plate 14 and an outer circumferential end surface of the friction member 16 is designed to be longer than a radial distance of a clearance defined between the guide portion 11b and an inner circumferential end surface of the friction member 16 (see FIG. 3). It is appropriate for the lining plate 14 to be made of metal (for example, stainless steel that does not easily rust compared to iron) in order to prevent the lining plate 14 from sticking to the friction member 15 and the friction member 16 because of an occurrence of rust on the lining plate 14.

The friction member 15 serving as the second friction member is a component of the limiter portion 2. As illustrated in FIG. 2, the friction member 15 having the annular shape is arranged between the lining plate 14 and the pressure plate 13. The friction member 15 is slidably pressed against the lining plate 14 and the pressure plate 13 therebetween. The friction member 15 may be made of a material, for example, rubber, resin, (short or long) fiber material, or a material that includes particles for adjusting a frictional coefficient μ.

The friction member 16 serving as the first friction member is a component of the limiter portion 2. As illustrated in FIG. 2, the friction member 16 having the annular shape is arranged between the lining plate 14 and the cover plate 11. The friction member 16 is slidably pressed against the lining plate 14 and the cover plate 11 therebetween. The friction member 16 may be made of a material, for example, rubber, resin, (short or long) fiber material, or a material that includes particles for adjusting a frictional coefficient μ.

The first side plate 17 serving as the fifth plate member is an annular member positioned to face a first surface of a flange portion 25b of the hub member 25. The first surface of the flange portion 25b faces the engine (the left side in FIG. 2) in the axial direction. The first side plate 17 arranged at a radially inward side of the friction member 15 is a component of each of the damper portion 3 and the hysteresis portion 4. A portion located adjacent to an outer circumferential end portion of the first side plate 17 is integrally fixed to the lining plate 14 and the second side plate 18 by the rivets 19 (the portion of the outer circumferential end portion will be hereinafter simply referred to the outer circumferential end portion). Opening portions 17a are formed in the first side plate 17 so as to be positioned radially at an intermediate portion of the damper portion 3. As illustrated in FIG. 1, the coil spring 20 and a pair of seat members 21 are accommodated in each of the opening portions 17a. Both end surfaces of the opening portion 17a in a circumferential direction of the first side plate 17 are contactable with and separable from the pair of seat members 21. The first side plate 17 is engaged with the first thrust member 22 in the hysteresis portion 4, which is positioned at a radially inward side of the damper portion 3, so as not to rotate relative to the first thrust member 22 and so as to move in the axial direction. As illustrated in FIG. 2, an inner circumferential end portion of the first side plate 17 is supported via the first thrust member 22 by the hub member 25 (by a hub portion 25a of the hub member 25) so that the first side plate 17 may rotate.

The second side plate 18 serving as the third plate member is an annular member positioned to face a second surface of the flange portion 25b of the hub member 25. The second surface of the flange portion 25b faces the transmission (the right side in FIG. 2) in the axial direction. The second side plate 18 arranged at a radially inward side of the friction member 16 is a component of each of the damper portion 3 and the hysteresis portion 4. A portion located adjacent to an outer circumferential end portion of the second side plate 18 is integrally fixed to the lining plate 14 and the first side plate 17 by the rivets 19 (the portion will be hereinafter referred to as an outer circumferential end portion). Opening portions 18a are formed in the second side plate 18 so as to be positioned radially at the intermediate portion of the damper portion 3. As illustrated in FIG. 1, the coil spring 20 and the pair of seat members 21 are accommodated in each of the opening portions 18a. Both end surfaces of the opening portion 18a in a circumferential direction of the second side plate 18 are contactable with and separable from the pair of seat members 21. The second side plate 18 is engaged with the second thrust member 23 in the hysteresis portion 4, which is positioned at the radially inward side of the damper portion 3, so as not to rotate relative the second thrust member 23 and so as to move in the axial direction. In addition, the second side plate 18 supports the disc spring 24. As illustrated in FIG. 2, an inner circumferential end portion of the second side plate 18 is supported via the second thrust member 23 by the hub member 25 (the hub portion 25a) so that the second side plate 18 may rotate.

The rivets 19 are fixing members to integrally fix the lining plate 14, the first side plate 17, and the second side plate 18 to one another.

The coil spring 20 is a component of the damper portion 3. The coil spring 20 is accommodated in the opening portion 17a formed in the first side plate 17, the opening portion 18a formed in the second side plate 18, and an opening portion 25c formed in the hub member 25 (the flange portion 25b)

(the multiple opening portions 25c are formed in the flange portion 25b in a circumferential direction of the hub member 25). The coil spring 20 is in contact with the pair of seat members 21 circumferentially arranged at both ends of each of the opening portion 17a, the opening portion 18a, and the opening portion 25c (see FIG. 1). The coil springs 20 are compressed when the first side plate 17 and the second side plate 18 rotate relative to the hub member 25, thereby absorbing a shock caused by a rotational difference among the first side plate 17, the second side plate 18, and the hub member 25. Each of the coil springs 20 may have a straight shape. Alternatively, a spring having a straight shape is bent and may be therefore utilized as the coil spring 20. An arc spring circumferentially curved may be utilized as the coil spring 20 in order to allow the large torsion between the rotational shafts (corresponding to the crankshaft of the engine and the input shaft of the transmission).

Figure 1:
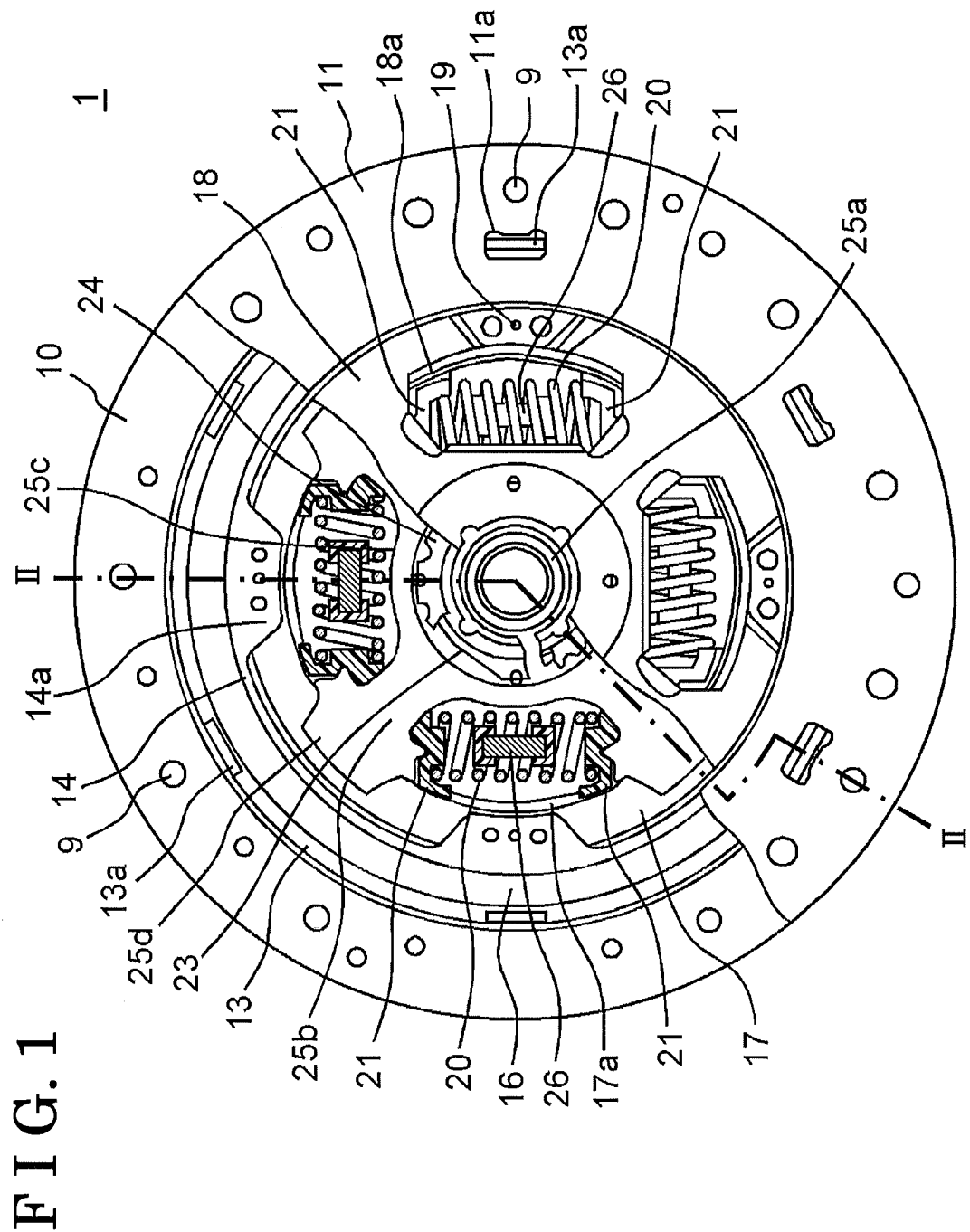
FIG. 1 is a plan view schematically illustrating a configuration of a torque fluctuation absorber according to a first embodiment disclosed here.

As illustrated in FIG. 1, the pair of seat members 21 each serving as a component of the damper portion 3 is accommodated in the opening portion 17a formed in the first side plate 17, the opening portion 18a formed in the second side plate 18, and the opening portion 25c formed in the hub member 25 (the flange portion 25b). The pair of seat members 21 is circumferentially arranged between both ends of the coil spring 20 and the end surfaces of the opening portion 17a, between the ends of the coil spring 20 and the end surfaces of the opening portion 18a, and between the ends of the coil spring 20 and both end surfaces of the opening portion 25c in the circumferential direction of the opening portions 17a, 18a, and 25c. The seat member 21 may be made of resin in order to reduce abrasion of the coil spring 20.

The first thrust member 22 is a component of the hysteresis portion 4 and is an annular member arranged between the first side plate 17 and the hub member 25 (see FIG. 2). The first thrust member 22 is positioned between the first side plate 17 and the flange portion 25b in the axial direction. The first thrust member 22 is engaged with the first side plate 17 so as not to rotate relative thereto and so as to move in the axial direction. The first thrust member 22 is slidably pressed against the flange portion 25b. The first thrust member 22 radially positioned between the first side plate 17 and the hub portion 25a serves as a slide bearing (bush) via which the first side plate 17 is rotatably supported by the hub portion 25a.

The second thrust member 23 is a component of the hysteresis portion 4 and is an annular member arranged between the second side plate 18 and the hub member 25 (see FIG. 2). The second thrust member 23 is positioned between the disc spring 24 and the flange portion 25b in the axial direction. The second thrust member 23 is engaged with the second side plate 18 so as not to rotate relative thereto and so as to move in the axial direction. The second thrust member 23 is biased toward the flange portion 25b by the disc spring 24 and is slidably pressed against the flange portion 25b. The second thrust member 23 radially positioned between the second side plate 18 and the hub portion 25a serves as a slide bearing (bush) via which the second side plate 18 is rotatably supported by the hub portion 25a.

The disc spring 24 is a component of the hysteresis portion 4. As illustrated in FIG. 2, the disc spring 24 is arranged between the second thrust member 23 and the second side plate 18. The disc spring 24 having an approximately conical shape biases the second thrust member 23 toward the flange portion 25b.

The hub member 25 transmitting a rotational driving force from the damper portion 3 and the hysteresis portion 4 to the transmission is a component of each of the damper portion 3 and the hysteresis portion 4. The hub member 25 includes the hub portion 25a and the flange portion 25b. The flange portion 25b extends radially outwardly from a predetermined portion of an outer circumferential portion of the hub portion 25a. As illustrated in FIG. 2, an inner circumferential surface of the hub portion 25a is splined to the input shaft of the transmission. The first side plate 17 is rotatably supported via the first thrust member 22 by the outer circumferential portion of the hub portion 25a. The second side plate 18 is rotatably supported via the second thrust member 23 by the outer circumferential portion of the hub portion 25a. The flange portion 25b includes the opening portions 25c in the damper portion 3. The coil spring 20 and the pair of seat members 21 are accommodated in each of the opening portions 25c. The end surfaces of the opening portion 25c in the circumferential direction of the opening portion 25c are contactable with and separable from the pair of seat members 21. The flange portion 25b has the first surface and the second surface that face the left side and the right side in the axial direction (see FIG. 2). The flange portion 25b is slidably supported via portions of the first surface and the second surface by the first thrust member 22 and the second thrust member 23. The portions of the first surface and the second surface are positioned in the hysteresis portion 4 located at the radially inward side of the damper portion 3. The flange portion 25b includes the multiple stopper portions 25d protruding radially outwardly from an outer circumferential end portion of the flange portion 25b. The stopper portions 25d restrict the torsion of the damper portion 3 within a predetermined angle. In the case that the torsion is generated at the damper portion 3, the stopper portions 25d of the hub member 25 make contact with the stopper portions 14a of the lining plate 14; thereby, the torsion of the damper portion 3 is absorbed (restrained).

The cushion members 26 absorb a shock generated when the stopper portions 25d of the hub member 25 make contact with the stopper portions 14a of the lining plate 14 in the case that the torsion is generated at the damper portion 3. Each of the cushion members 26 formed into cylindrical shapes is arranged within the coil spring 20. When the torsion is generated at the damper portion 3 as described above, the cushion member 26 remains in an unloaded condition until the cushion member 26 is pressed by the pair of seat members 21 therebetween. In addition, when the torsion is generated at the damper portion 3 as described above, the cushion member 26 is pressed by the pair of seat members 21 therebetween before the stopper portions 25d of the hub member 25 make contact with the stopper portions 14a of the lining plate 14.

According to the torque fluctuation absorber 1 of the first embodiment, both surfaces of the friction member 16, which face toward the axial direction, are slidable relative to the cover plate 11 and the lining plate 14 in the limiter portion 2 and both surfaces of the friction member 15, which face toward the axial direction, are slidable relative to the pressure plate 13 and the lining plate 14 in the limiter portion 2. However, the guide portion 11b is arranged at the cover plate 11 so as to be located at the radially inward side of the friction member 16 and the guide portion 13b is arranged at the pressure plate 13 so as to be located at the radially inward side of the friction member 15. As a result, the friction member 16 and the friction member 15 may be restricted from moving radially inwardly beyond the cover plate 11 and the pressure plate 13, respectively; therefore, characteristics of the limiter portion 2 may be stably maintained. In addition, the friction member 16 is configured to have the surfaces slidable relative to the cover plate 11 and the lining plate 14 and the friction member 15 is configured to have the surfaces slidable relative to the pressure plate 13 and the lining plate 14; thereby, a manufacturing process to fix the friction member 16 and the friction member 15 to plates, respectively, is unnecessary (i.e., it is unnecessary for the friction members 16 and 15 to be attached to the plates, for example, by means of rivets or adhesive). Thus, the number of components for the torque fluctuation absorber 1 may be minimized, therefore reducing costs of the torque fluctuation absorber 1. According to the torque fluctuation absorber 1 of the first embodiment, the guide portion 11b and the guide portion 13b that are bent portions (having bent or curved shapes) are arranged at the cover plate 11 and the pressure plate 13, respectively, thereby increasing the strengths of the cover plate 11 and the pressure plate 13.

Figure 4:
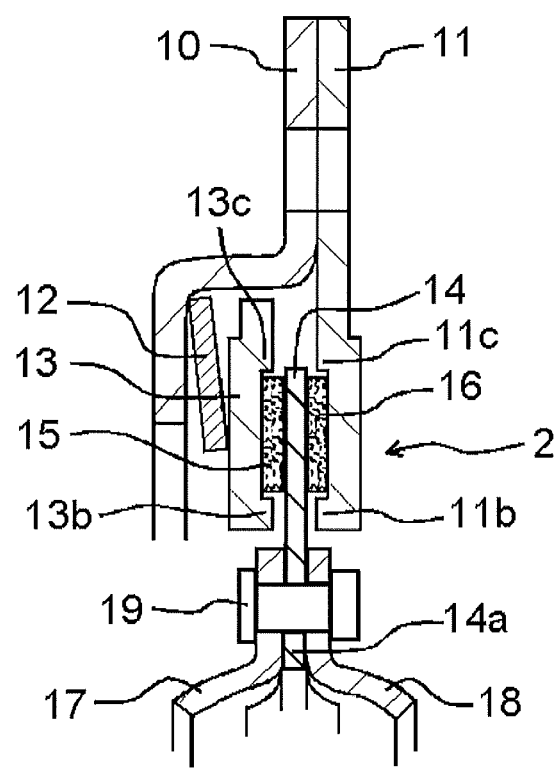
FIG. 4 is an enlarged sectional view schematically illustrating a configuration of the limiter portion of the torque fluctuation absorber according to a second embodiment disclosed here.

The torque fluctuation absorber 1 according to a second embodiment will be explained as follows with reference to FIG. 4.

The second embodiment is a modified example of the first embodiment. According to the second embodiment, the torque fluctuation absorber 1 is provided with the guide portion 11b (the first guide portion) arranged at the radially inward side of the friction member 16 and the guide portion 13b (the second guide portion) arranged at the radially inward side of the friction member 15. In addition, the torque fluctuation absorber 1 is provided with a guide portion 11c (a third guide portion) positioned at a radially outward side of the friction member 16 and a guide portion 13c (a fourth guide portion) positioned at a radially outward side of the friction member 15. The guide portion 11c restricts the friction member 16 from moving radially outwardly, thereby inhibiting the friction member 16 from moving radially outwardly beyond the lining plate 14. The guide portion 13c restricts the friction member 15 from moving radially outwardly, thereby inhibiting the friction member 15 from moving radially outwardly beyond the lining plate 14. The guide portion 11c formed at the cover plate 11 is an annular stepped section. A radially inward surface of the stepped section (the guide portion 11c) of the cover plate 11 restricts the friction member 16 from moving radially outwardly. The guide portion 13c formed at the pressure plate 13 is an annular stepped section. A radially inward surface of the stepped section (the guide portion 13c) of the pressure plate 13 restricts the friction member 15 from moving radially outwardly. The guide portion 11c and the guide portion 13c are configured not to be in contact with the lining plate 14. Other configurations of the torque fluctuation absorber 1 according to the second embodiment are similar to those of the torque fluctuation absorber 1 according to the first embodiment.

The torque fluctuation absorber 1 according to the second embodiment has effects similar to those of the torque fluctuation absorber 1 according to the first embodiment. In addition, the friction member 16 and the friction member 15 may be restricted by the guide portion 11c and the guide portion 13c, respectively, from moving radially outwardly beyond the lining plate 14. As described above, according to the second embodiment, the guide portion 11c and the guide portion 13c restrict two friction members (the friction member 16 and the friction member 15) from moving radially outwardly beyond the lining plate 14. Alternatively, one of the guide portion 11c and the guide portion 13c may restrict one of the two friction members from moving radially outwardly beyond the lining plate 14.

Figure 5:
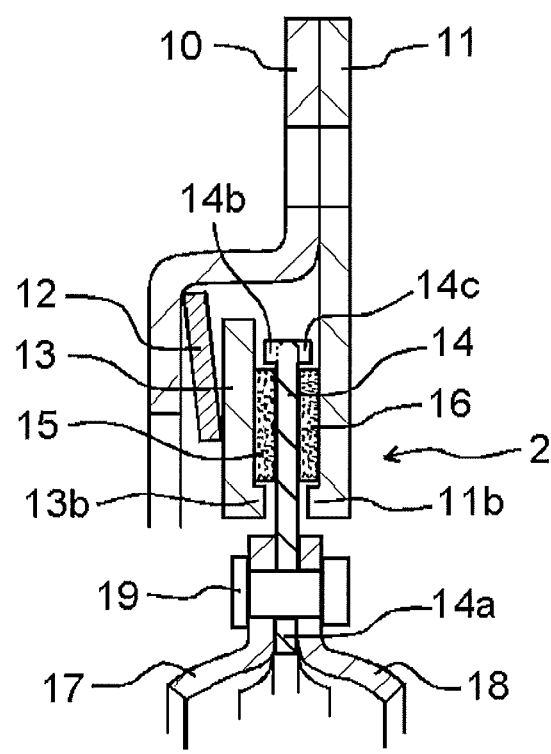
FIG. 5 is an enlarged sectional view schematically illustrating a configuration of the limiter portion of the torque fluctuation absorber according to a third embodiment disclosed here.

The torque fluctuation absorber 1 according to a third embodiment will be explained as follows with reference to FIG. 5.

The third embodiment is a modified example of the first embodiment. According to the third embodiment, the torque fluctuation absorber 1 is provided with the guide portion 11b (the first guide portion) arranged at the radially inward side of the friction member 16 and the guide portion 13b (the second guide portion) arranged at the radially inward side of the friction member 15. In addition, the torque fluctuation absorber 1 is provided with a guide portion 14c (the third guide portion) positioned at the radially outward side of the friction member 16 and a guide portion 14b (the fourth guide portion) positioned at the radially outward side of the friction member 15. The guide portion 14b and the guide portion 14c restrict the friction member 15 and the friction member 16, respectively, from moving radially outwardly, thereby inhibiting the friction member 15 and the friction member 16 from moving radially outwardly beyond the lining plate 14. A portion of the outer circumferential end portion of the lining plate 14 is bent toward the pressure plate 13, thereby forming a bent portion serving as the guide portion 14b. The bent portion (the guide portion 14b) of the lining plate 14 has a stepped section. A radially inward surface of the stepped section of the bent portion (the guide portion 14b) of the lining plate 14 restricts the friction member 15 from moving radially outwardly. A portion (not including the guide portion 14b) of the outer circumferential end portion of the lining plate 14 is bent toward the cover plate 11, thereby forming a bent portion serving as the guide portion 14c. The bent portion (the guide portion 14c) of the lining plate 14 has a stepped section. A radially inward surface of the stepped section of the bent portion (the guide portion 14c) of the lining plate 14 restricts the friction member 16 from moving radially outwardly. The guide portion 14b and the guide portion 14c are configured not to be in contact with the pressure plate 13 and the cover plate 11, respectively. Other configurations of the torque fluctuation absorber 1 according to the third embodiment are similar to those of the torque fluctuation absorber 1 according to the first embodiment.

According to the third embodiment, the guide portion 14b (the fourth guide portion) is formed as the bent portion bent toward the pressure plate 13 (the fourth plate member) so as to be positioned at the radially outward side of the friction member 15 (the second friction member); thereby, the torque fluctuation absorber 1 of the third embodiment has effects similar to those of the torque fluctuation absorber 1 of the first embodiment. In addition, the friction member 15 may be restricted by the guide portion 14b from moving radially outwardly beyond the lining plate 14. Moreover, according to the third embodiment, a portion of the outer circumferential end portion of the lining plate 14 (the second plate member) is bent toward the cover plate 11 (the first plate member) so as to be positioned at the radially outward side of the friction member 16 (the first friction member), thereby forming the guide portion 14c (the third guide portion). Therefore, the friction member 16 may be restricted by the guide portion 14c from moving radially outwardly beyond the lining plate 14.

Figure 6:
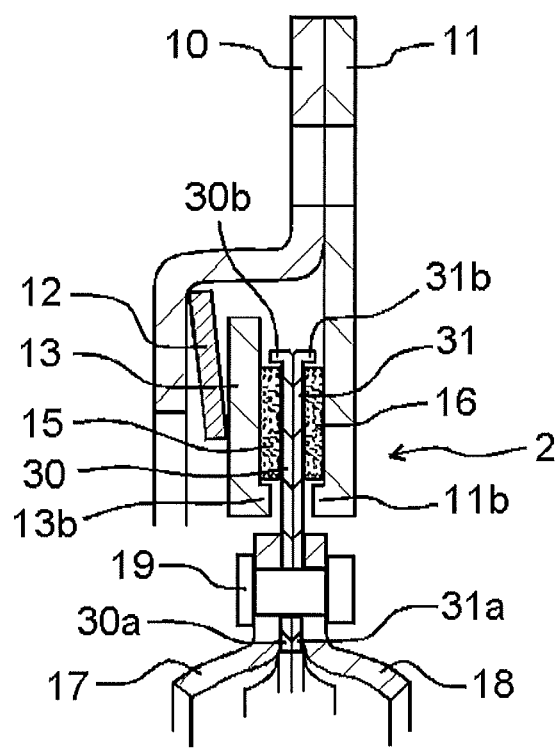
FIG. 6 is an enlarged sectional view schematically illustrating a configuration of the limiter portion of the torque fluctuation absorber according to a fourth embodiment disclosed here.

The torque fluctuation absorber 1 according to a fourth embodiment will be explained as follows with reference to FIG. 6.

The fourth embodiment is a modified example of the first embodiment. According to the first embodiment, the torque fluctuation absorber 1 is provided with the single lining plate 14 (in FIG. 3). Alternatively, according to the fourth embodiment, the torque fluctuation absorber 1 is provided with two lining plates 31 and 30 overlapped with each other and collectively constituting a second plate member. In addition to the guide portion 11b arranged at the radially inward side of the friction member 16 and the guide portion 13b arranged at the radially inward side of the friction member 15, the torque fluctuation absorber 1 of the fourth embodiment includes a guide portion 31b (the third guide portion) positioned at the radially outward side of the friction member 16 and a guide portion 30b (the fourth guide portion) positioned at the radially outward side of the friction member 15. The guide portion 31b restricts the friction member 16 from moving radially outwardly beyond the lining plate 31. The guide portion 30b restricts the friction member 15 from moving radially outwardly beyond the lining plate 30.

The lining plate 31 corresponding to a first plate and the lining plate 30 corresponding to a second plate are annular members arranged between the friction member 16 and the friction member 15 that are positioned between the cover plate 11 and the pressure plate 13. The lining plates 31 and 30 are components of the limiter portion 2. The lining plate 31 includes multiple stopper portions 31a and the lining plate 30 includes multiple stopper portions 30a. The stopper portions 31a of the lining plate 31 protrude radially inwardly from a radially inward side of the lining plate 31 and the stopper portions 30a of the lining plate 30 protrude radially inwardly from a radially inward side of the lining plate 30. The stopper portions 31a and 30a restrict the torsion of the damper portion 3 within a predetermined angle. In particular, in a case where the torsion is generated at the damper portion 3, the stopper portions 31a and 30a make contact with stopper portions 25d of the hub member 25, thereby restricting the torsion of the damper portion 3. The stopper portions 31a and 30a are sandwiched between the second side plate 18 and the first side plate 17 and are integrally fixed to the second side plate 18 and the first side plate 17 by the rivets 19. Outer circumferential portions of the lining plates 31 and 30 are positioned between the friction member 16 and the friction member 15. The lining plate 31 is slidably pressed against the friction member 16. The lining plate 30 is slidably pressed against the friction member 15. Outer circumferential end portions of the lining plates 31 and 30 are arranged at the radially inward side of the convex portion 13a of the pressure plate 13. The lining plate 31 includes the guide portion 31b. The outer circumferential end portion of the lining plate 31 is bent toward the cover plate 11, thereby forming the guide portion 31b. A radially inward surface of the guide portion 31b restricts the friction member 16 from moving radially outwardly. The lining plate 30 includes the guide portion 30b. The outer circumferential end portion of the lining plate 30 is bent toward the pressure plate 13, thereby forming the guide portion 30b. A radially inward surface of the guide portion 30b restricts the friction member 15 from moving radially outwardly. The guide portions 31b and 30b are continuously circumferentially formed at the lining plates 31 and 30, respectively (the guide portions 31b and 30b may be partially continuously formed at the lining plates 31 and 30, respectively). The lining plates 31 and 30 are arranged so as not to be in contact with the cover plate 11 and the pressure plate 13, respectively. It is appropriate for the lining plates 31 and 30 to be made of metal (for example, stainless steel that does not easily rust compared to iron) in order to prevent the lining plates 31 and 30 from sticking to the friction member 16 and the friction member 15 because of an occurrence of rust on the lining plates 31 and 30.

Other configurations of the torque fluctuation absorber 1 according to the fourth embodiment are similar to those of the torque fluctuation absorber 1 according to the first embodiment.

According to the torque fluctuation absorber 1 of the fourth embodiment, the second plate member is formed by the first lining plate (the lining plate 31) and the second lining plate (the lining plate 30) that are overlapped with each other. The guide portion 31b (the third guide portion) is the bent portion of the outer circumferential end portion of the first lining plate 31, the bent portion being bent toward the cover plate 11 (the first plate member) and positioned at the radially outward side of the friction member 16 (the first friction member). The guide portion 30b (the fourth guide portion) is the bent portion of the outer circumferential end portion of the second lining plate 30, the bent portion being bent toward the pressure plate 13 (the fourth plate member) and positioned at the radially outward side of the friction member 15 (the second friction member). According to the aforementioned configuration, the torque fluctuation absorber 1 of the fourth embodiment has effects similar to those of the torque fluctuation absorber 1 of the first embodiment. In addition, the guide portion 31b may restrict the friction member 16 from moving radially outwardly beyond the lining plate 31 and the guide portion 30b may restrict the friction member 15 from moving radially outwardly beyond the lining plate 30.

Figure 7:
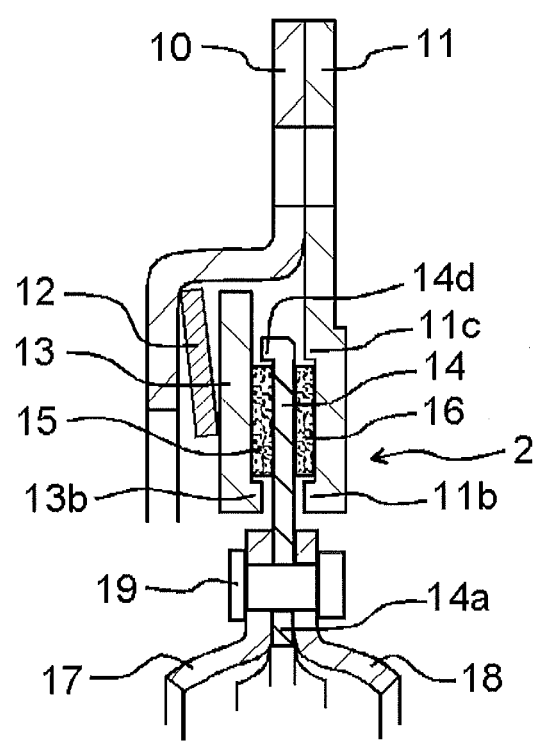
FIG. 7 is an enlarged sectional view schematically illustrating a configuration of the limiter portion of the torque fluctuation absorber according to a fifth embodiment disclosed here.

The torque fluctuation absorber 1 according to a fifth embodiment will be explained as follows with reference to FIG. 7.

The fifth embodiment is a modified example of the first embodiment. According to the fifth embodiment, the torque fluctuation absorber 1 is provided with the guide portion 11b (the first guide portion) arranged at the radially inward side of the friction member 16 and the guide portion 13b (the second guide portion) arranged at the radially inward side of the friction member 15. In addition, the torque fluctuation absorber 1 is provided with the guide portion 11c (the third guide portion) arranged at the radially outward side of the friction member 16 and a guide portion 14d (the fourth guide portion) arranged at the radially outward side of the friction member 15. The guide portion 11c and the guide portion 14d restrict the friction member 16 and the friction member 15, respectively, from moving radially outwardly beyond the lining plate 14. The guide portion 11c is the annular stepped section formed at the cover plate 11. The radially inward surface of the stepped section (the guide portion 11c) of the cover plate 11 restricts the friction member 16 from moving radially outwardly. The guide portion 11c is arranged so as not to be in contact with the lining plate 14. The guide portion 14d is a bent portion of the outer circumferential end portion of the lining plate 14, the bent portion being bent toward the pressure plate 13. A radially inward surface of the bent portion (the guide portion 14d) of the lining plate 14 restricts the friction member 15 from moving radially outwardly. The guide portion 14d is continuously circumferentially formed at the lining plate 14 (the guide portion 14d may be partially circumferentially formed at the lining plate 14). The guide portion 14d is arranged so as not to be in contact with the pressure plate 13. Other configurations of the torque fluctuation absorber 1 according to the fifth embodiment are similar to those of the torque fluctuation absorber 1 according to the first embodiment.

The torque fluctuation absorber 1 according to the fifth embodiment has effects similar to those of the torque fluctuation absorber 1 according to the first embodiment. In addition, the guide portion 11c and the guide portion 14d may restrict the friction member 16 and the friction member 15, respectively, from moving radially outwardly beyond the lining plate 14.

Figure 8:
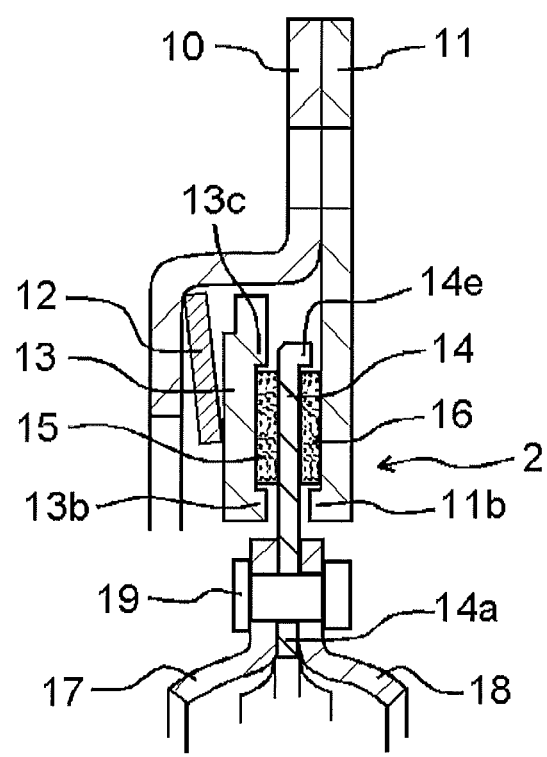
FIG. 8 is an enlarged sectional view schematically illustrating a configuration of the limiter portion of the torque fluctuation absorber according to a sixth embodiment disclosed here.

The torque fluctuation absorber 1 according to a sixth embodiment will be explained as follows with reference to FIG. 8.

The sixth embodiment is a modified example of the first embodiment. According to the sixth embodiment, the torque fluctuation absorber 1 is provided with the guide portion 11b (the first guide portion) arranged at the radially inward side of the friction member 16 and the guide portion 13b (the second guide portion) arranged at the radially inward side of the friction member 15. In addition, the torque fluctuation absorber 1 is provided with the guide portion 13c (the fourth guide portion) arranged at the radially outward side of the friction member 15 and a guide portion 14e (the third guide portion) arranged at the radially outward side of the friction member 16. The guide portion 13c is the annular stepped section formed at the pressure plate 13. The radially inward surface of the stepped section (the guide portion 13c) of the pressure plate 13 restricts the friction member 15 from moving radially outwardly. The guide portion 13c is arranged so as not to be in contact with the lining plate 14. The guide portion 14e is a bent portion of the outer circumferential end portion of the lining plate 14, the bent portion being bent toward the cover plate 11. A radially inward surface of the bent portion (the guide portion 14e) of the lining plate 14 restricts the friction member 16 from moving radially outwardly. The guide portion 14e is continuously circumferentially formed at the lining plate 14 (the guide portion 14e may be partially circumferentially formed at the lining plate 14). The guide portion 14e is arranged so as not to be in contact with the cover plate 11. Other configurations of the torque fluctuation absorber 1 according to the sixth embodiment are similar to those of the torque fluctuation absorber 1 according to the first embodiment.

The torque fluctuation absorber 1 according to the sixth embodiment has effects similar to those of the torque fluctuation absorber 1 according to the first embodiment. In addition, the guide portion 13c and the guide portion 14e may restrict the friction member 15 and the friction member 16, respectively, from moving radially outwardly beyond the lining plate 14.

Figure 9:
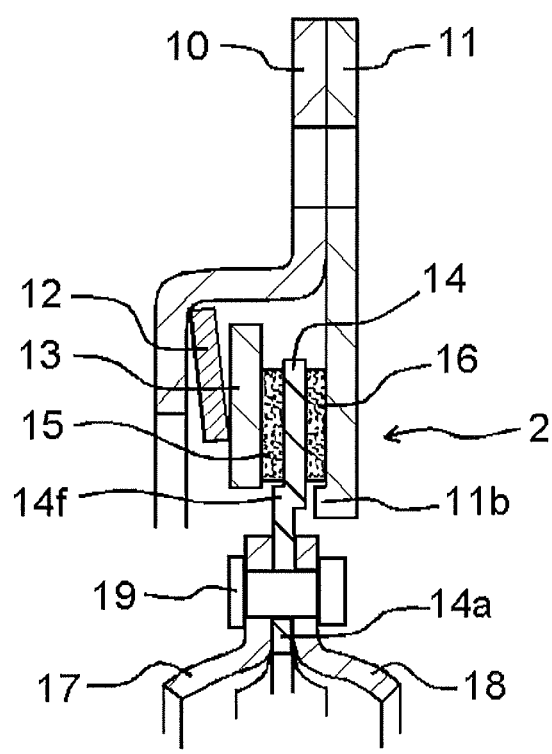
FIG. 9 is an enlarged sectional view schematically illustrating a configuration of the limiter portion of the torque fluctuation absorber according to a seventh embodiment disclosed here.

The torque fluctuation absorber 1 according to a seventh embodiment will be explained as follows with reference to FIG. 9.

The seventh embodiment is a modified example of the first embodiment. According to the torque fluctuation absorber 1 of the first embodiment, the guide portion 13b (in FIG. 3) serving as the second guide portion and positioned at the radially inward side of the annular friction member 15 is arranged at the pressure plate 13. Alternatively, according to the torque fluctuation absorber 1 of the seventh embodiment, a guide portion 14f (the second guide portion) is arranged at the lining plate 14. The guide portion 14f is an annular stepped section formed at the lining plate 14. A radially outward surface of the stepped section (the guide portion 14f) of the lining plate 14 restricts the friction member 15 from moving radially inwardly. The guide portion 14f is continuously circumferentially formed at the lining plate 14. The guide portion 14f is arranged so as not to be in contact with the pressure plate 13. Other configurations of the torque fluctuation absorber 1 according to the seventh embodiment are similar to those of the torque fluctuation absorber 1 according to the first embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

The torque fluctuation absorber 1 according to the seventh embodiment has effects similar to those of the torque fluctuation absorber 1 according to the first embodiment.

Figure 10:
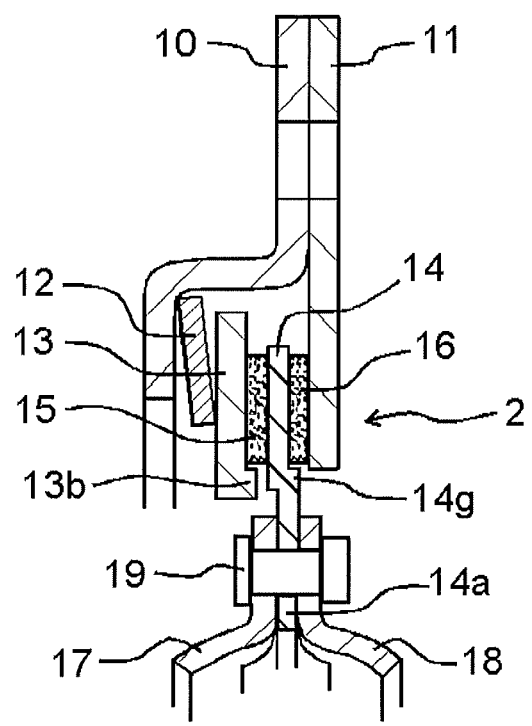
FIG. 10 is an enlarged sectional view schematically illustrating a configuration of the limiter portion of the torque fluctuation absorber according to an eighth embodiment disclosed here.

The torque fluctuation absorber 1 according to an eighth embodiment will be explained as follows with reference to FIG. 10.

The eighth embodiment is a modified example of the first embodiment. According to the torque fluctuation absorber 1 of the first embodiment, the guide portion 11b (in FIG. 3) serving as the first guide portion and positioned at the radially inward side of the annular friction member 16 is arranged at the cover plate 11. Alternatively, according to the torque fluctuation absorber 1 of the eighth embodiment, a guide portion 14g (the first guide portion) is arranged at the lining plate 14. The guide portion 14g is an annular stepped section formed at the lining plate 14. A radially outward surface of the stepped section (the guide portion 14g) of the lining plate 14 restricts the friction member 16 from moving radially inwardly. The guide portion 14g is continuously circumferentially formed at the lining plate 14. The guide portion 14g is arranged so as not to be in contact with the cover plate 11. Other configurations of the torque fluctuation absorber 1 according to the eighth embodiment are similar to those of the torque fluctuation absorber 1 according to the first embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

The torque fluctuation absorber 1 according to the eighth embodiment has effects similar to those of the torque fluctuation absorber 1 according to the first embodiment.

The torque fluctuation absorber 1 according to a ninth embodiment will be explained as follows with reference to FIG. 11.

The ninth embodiment is a modified example of the first embodiment. According to the torque fluctuation absorber 1 of the first embodiment, the guide portion 11b (in FIG. 3) serving as the first guide portion and positioned at the radially inward side of the friction member 16 is arranged at the cover plate 11. Further, the guide portion 13b (in FIG. 3) serving as the second guide portion and positioned at the radially inward side of the friction member 15 is arranged at the pressure plate 13. Alternatively, the torque fluctuation absorber 1 according to the ninth embodiment is provided with a guide member 34 (a first guide member corresponding to the first guide portion) and a guide member 33 (a second guide member corresponding to the second guide portion). The guide member 34 is a separate member separated from the cover plate 11 and the guide member 33 is a separate member separated from the pressure plate 13.

The guide member 34 (the guide portion) is an annular member formed along an inner circumferential portion of the cover plate 11. The guide member 34 is located between the cover plate 11 and the lining plate 14 and is arranged at the radially inward side of the annular friction member 16; thereby, radial and axial movements of the guide member 34 relative to the cover plate 11 are restricted (the radial movement of the guide member 34 is restricted by an inner circumferential surface of the cover plate 11). In addition, the guide member 34 restricts the friction member 16 from moving radially inwardly. The guide member 34 is slidable relative to the cover plate 11 and the lining plate 14. A material that easily wears as compared with the friction member 16 is utilized for the guide member 34.

The guide member 33 (the guide portion) is an annular member formed along an inner circumferential portion of the pressure plate 13. The guide member 33 is located between the pressure plate 13 and the lining plate 14 and is arranged at the radially inward side of the annular friction member 15; thereby, radial and axial movements of the guide member 33 relative to the pressure plate 13 are restricted (the radial movement of the guide member 33 is restricted by an inner circumferential surface of the pressure plate 13). In addition, the guide member 33 restricts the friction member 15 from moving radially inwardly. The guide member 33 is slidable relative to the pressure plate 13 and the lining plate 14. A material that easily wears as compared with the friction member 15 is utilized for the guide member 33.

Other configurations of the torque fluctuation absorber 1 according to the ninth embodiment are similar to those of the torque fluctuation absorber 1 according to the first embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

According to the torque fluctuation absorber 1 of the ninth embodiment, even in a condition where the surfaces of the friction member 16 and the surfaces of the friction member 15 are configured to be slidable in the limiter portion 2, the guide member 34 and the guide member 33 are arranged at the radially inward sides of the friction member 16 and the friction member 15, respectively. Therefore, the friction member 16 is restricted by the guide member 34 from moving radially inwardly beyond the cover plate 11 and the friction member 15 is restricted by the guide member 33 from moving radially inwardly beyond the pressure plate 13. Consequently, the characteristics of the limiter portion 2 may be stably maintained. Moreover, the guide member 34 and the guide member 33 are additionally utilized in the torque fluctuation absorber 1, thereby restricting the friction member 16 from moving radially inwardly beyond the cover plate 11 and restricting the friction member 15 from moving radially inwardly beyond the pressure plate 13. As a result, design changes of components other than those of the guide member 34 and the guide member 33 are unnecessary.

Figure 12:
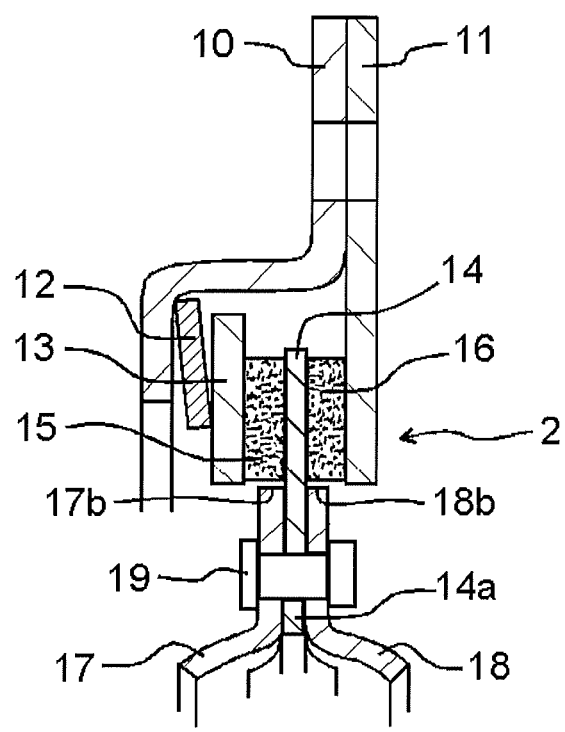
FIG. 12 is an enlarged sectional view schematically illustrating a configuration of the limiter portion of the torque fluctuation absorber according to a tenth embodiment disclosed here.

The torque fluctuation absorber 1 according to a tenth embodiment will be explained as follows with reference to FIG. 12.

The tenth embodiment is a modified example of the first embodiment. According to the torque fluctuation absorber 1 of the first embodiment, the guide portion 11b (in FIG. 3) serving as the first guide portion and positioned at the radially inward side of the friction member 16 is arranged at the cover plate 11. Further, the guide portion 13b (in FIG. 3) serving as the second guide portion and positioned at the radially inward side of the friction member 15 is arranged at the pressure plate 13. Alternatively, the torque fluctuation absorber 1 according to the tenth embodiment is provided with a guide portion 18b (the first guide portion) and a guide portion 17b (the second guide portion). The guide portion 18b and the guide portion 17b are components of the damper portion 3 (in FIG. 2). The guide portion 18b and the guide portion 17b are outer circumferential end surfaces of the second side plate 18 and the first side plate 17, respectively (the outer circumferential end surfaces are adjacent to respective portions of the second side plate 18 and the first side plate 17, which portions are fixed to each other by the rivets 19). Thicknesses of the friction member 16 and the friction member 15 are designed to be larger than thicknesses of the second side plate 18 and the first side plate 17. The guide portion 18b restricting the friction member 16 from moving radially inwardly is arranged in a clearance between the lining plate 14 and the cover plate 11. The guide portion 17b restricting the friction member 15 from moving radially inwardly is arranged in a clearance between the lining plate 14 and the pressure plate 13. In a case where the lining plate 14 is coaxially positioned with the friction member 16 and the friction member 15, the radial distance defined between the outer circumferential end surface of the lining plate 14 and the outer circumferential end surface of the friction member 16 is designed to be longer than a radial distance of a clearance defined between the guide portion 18b and the inner circumferential end surface of the friction member 16. In addition, the radial distance defined between the outer circumferential end surface of the lining plate 14 and the outer circumferential end surface of the friction member 15 is designed to be longer than a radial distance of a clearance defined between the guide portion 17b and the inner circumferential end surface of the friction member 15. Other configurations of the torque fluctuation absorber 1 according to the tenth embodiment are similar to those of the torque fluctuation absorber 1 according to the first embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

According to the torque fluctuation absorber 1 of the tenth embodiment, even in a condition where the surfaces of the friction member 16 and the surfaces of the friction member 15 are configured to be slidable in the limiter portion 2, the guide portion 18b and the guide portion 17b are arranged at the radially inward sides of the friction member 16 and the friction member 15, respectively. Therefore, the friction member 16 is restricted by the guide portion 18b from moving radially inwardly beyond the cover plate 11 and the friction member 15 is restricted by the guide portion 17b from moving radially inwardly beyond the pressure plate 13. Consequently, the characteristics of the limiter portion 2 may be stably maintained. Moreover, the surfaces of the friction member 16 and the surfaces of the friction member 15 are configured to be slidable; therefore, a manufacturing process to fix the friction member 16 and the friction member 15 to plates, respectively, is unnecessary (i.e., it is unnecessary for the friction members 16 and 15 to be attached to the plates, for example, by means of rivets or adhesive). As a result, the number of components for the torque fluctuation absorber 1 may be minimized, therefore reducing costs of the torque fluctuation absorber 1. In addition, according to the torque fluctuation absorber 1 of the tenth embodiment, it is appropriate for the thickness of the friction member 15 (the second friction member) to be larger than the thickness of the first side plate 17 (the fifth plate member). It is appropriate for the guide portion 17b (the second guide portion) to be arranged between the pressure plate 13 (the fourth plate member) and the lining plate 14 (the second plate member).

Figure 13:
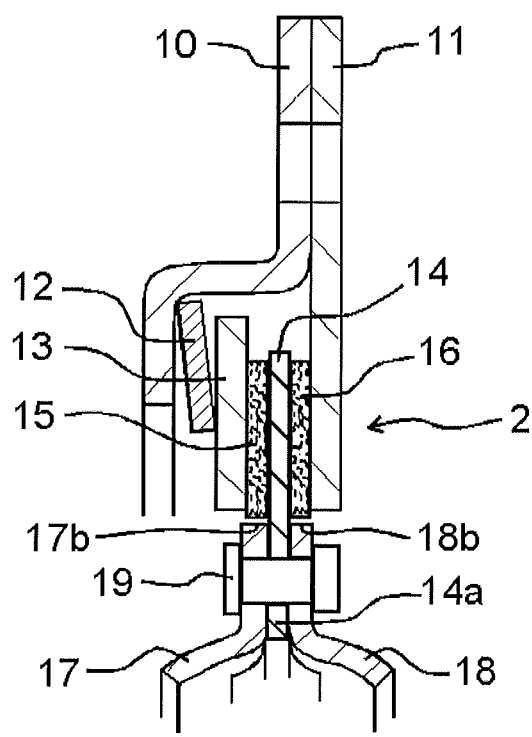
FIG. 13 is an enlarged sectional view schematically illustrating a configuration of the limiter portion of the torque fluctuation absorber according to an eleventh embodiment disclosed here.

The torque fluctuation absorber 1 according to an eleventh embodiment will be explained as follows with reference to FIG. 13.

The eleventh embodiment is a modified example of the tenth embodiment. According to the torque fluctuation absorber 1 of the tenth embodiment, the friction member 16 and the friction member 15 are arranged so as not to extend radially inwardly beyond the cover plate 11 and the pressure plate 13, respectively. Alternatively, according to the torque fluctuation absorber 1 of the eleventh embodiment, as illustrated in FIG. 13, in a state where the friction member 16 and the friction member 15 are maintained to extend radially inwardly beyond the cover plate 11 and the pressure plate 13, respectively, the guide portion 18b of the outer circumferential end surface of the second side plate 18 restricts the friction member 16 from moving radially inwardly and the guide portion 17b of the outer circumferential end surface of the first side plate 17 restricts the friction member 15 from moving radially inwardly (the outer circumferential end surfaces are adjacent to the respective portions of the second side plate 18 and the first side plate 17, which portions are fixed to each other by the rivets 19). Other configurations of the torque fluctuation absorber 1 according to the eleventh embodiment are similar to those of the torque fluctuation absorber 1 according to the tenth embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

According to the torque fluctuation absorber 1 of the eleventh embodiment, even in a condition where the surfaces of the friction member 16 and the surfaces of the friction member 15 are configured to be slidable in the limiter portion 2, the guide portion 18b (the first guide portion) and the guide portion 17b (the second guide portion) are arranged at the radially inward sides of the friction member 16 and the friction member 15, respectively. Therefore, the friction member 16 and the friction member 15 may be maintained to extend radially inwardly beyond the cover plate 11 and the pressure plate 13, respectively. Consequently, the characteristics of the limiter portion 2 may be stably maintained. Moreover, the surfaces of the friction member 16 and the surfaces of the friction member 15 are configured to be slidable; therefore, a manufacturing process to fix the friction member 16 and the friction member 15 to plates, respectively, is unnecessary (i.e., it is unnecessary for the friction members 16 and 15 to be attached to the plates, for example, by means of rivets or adhesive). As a result, the number of components for the torque fluctuation absorber 1 may be minimized, therefore reducing costs of the torque fluctuation absorber 1.

Figure 14:
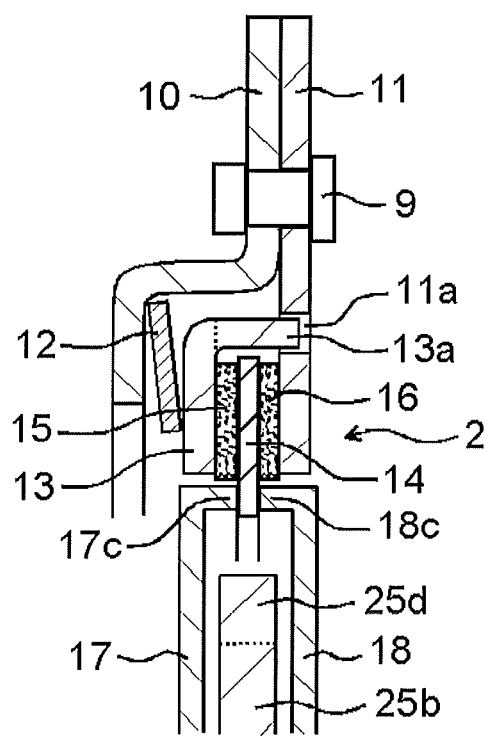
FIG. 14 is an enlarged sectional view schematically illustrating a configuration of the limiter portion of the torque fluctuation absorber according to a twelfth embodiment disclosed here.

The torque fluctuation absorber 1 according to a twelfth embodiment will be explained as follows with reference to FIG. 14.

The twelfth embodiment is a modified example of the eleventh embodiment. According to the torque fluctuation absorber 1 of the eleventh embodiment, the guide portion 18b of the outer circumferential end surface of the second side plate 18 restricts the friction member 16 from moving radially inwardly and the guide portion 17b of the outer circumferential end surface of the first side plate 17 restricts the friction member 15 from moving radially inwardly (the outer circumferential end surfaces are adjacent to the respective portions of the second side plate 18 and the first side plate 17, which portions are fixed to each other by the rivets 19). Alternatively, according to the torque fluctuation absorber 1 of the twelfth embodiment, outer circumferential portions of the second side plate 18 and the first side plate 17 include respective portions positioned circumferentially away from the outer circumferential end surfaces fixed to the lining plate 14 by rivets (each corresponding to the rivet 19 of FIG. 13), and the respective portions of the outer circumferential portions of the second side plate 18 and the first side plate 17 are bent toward the lining plate 14. As a result, a guide portion 18c (the first guide portion) and a guide portion 17c (the second guide portion) are formed at the second side plate 18 and the first side plate 17, respectively. Moreover, according to the twelfth embodiment, the friction member 16 and the friction member 15 are maintained to extend radially inwardly beyond the cover plate 11 and the pressure plate 13, respectively. Other configurations of the torque fluctuation absorber 1 according to the twelfth embodiment are similar to those of the torque fluctuation absorber 1 according to the eleventh embodiment. In addition, guide portions may be provided at the radially outward side of the friction member 16 and at the radially outward side of the friction member 15 in the same way as in the second, third, fourth, fifth, and sixth embodiments (see FIGS. 4, 5, 6, 7, and 8).

The torque fluctuation absorber 1 according to the twelfth embodiment has effects similar to those of the torque fluctuation absorber 1 according to the eleventh embodiment.

As described above, according to the aforementioned embodiments, the torque fluctuation absorber 1 includes the cover plate 11 being rotatable, the lining plate 14 positioned to be axially separated from the cover plate 11, the lining plate 14 being rotatable relative to the cover plate 11, the friction member 16 arranged between the cover plate 11 and the lining plate 14 and slidably pressed against the cover plate 11 and the lining plate 14, and the guide portion 11b, 14g, 34, 18b, 18c restricting the friction member 16 from moving radially inwardly.

According to the aforementioned first to seventh embodiments, the guide portion 11b is the bent portion formed at the cover plate 11, the bent portion being bent toward the lining plate 14 to be positioned at the radially inward side of the friction member 16.

According to the aforementioned eighth embodiment, the guide portion 14g is the stepped portion formed at the lining plate 14 to be positioned at the radially inward side of the friction member 16.

According to the aforementioned ninth embodiment, the guide portion 34 is arranged between the cover plate 11 and the lining plate 14 to be positioned at the radially inward side of the friction member 16. The guide portion 34 serves as the guide member 34 restricted from moving radially by the inner circumferential surface of the cover plate 11.

According to the aforementioned tenth and eleventh embodiments, the torque fluctuation absorber 1 further includes the second side plate 18 arranged at the radially inward side of the friction member 16 and fixed to the lining plate 14. The second side plate 18 is a component of the damper portion 3 absorbing the torque fluctuations by the elastic force. The guide portion 18b is the outer circumferential end surface of the second side plate 18.

According to the aforementioned tenth embodiment, the thickness of the friction member 16 is larger than the thickness of the second side plate 18. The guide portion 18b is arranged in the clearance between the cover plate 11 and the lining plate 14.

According to the aforementioned twelfth embodiment, the torque fluctuation absorber 1 further includes the second side plate 18 arranged at the radially inward side of the friction member 16 and fixed to the lining plate 14. The second side plate 18 is a component of the damper portion 3 absorbing the torque fluctuations by the elastic force. The guide portion 18c is the bent portion of the outer circumferential end portion of the second side plate 18, the bent portion being bent toward the lining plate 14.

According to the aforementioned eleventh and twelfth embodiments, the friction member 16 extends radially inwardly beyond the cover plate 11.

According to the aforementioned embodiments, the torque fluctuation absorber 1 further includes the pressure plate 13 positioned axially at the opposite side of the lining plate 14 from the cover plate 11 and axially separated from the lining plate 14, the pressure plate 13 integrally rotating with the cover plate 11 and being rotatable relative to the lining plate 14, the friction member 15 arranged between the pressure plate 13 and the lining plate 14 and slidably pressed against the pressure plate 13 and the lining plate 14, and the guide portion 13b, 14f, 33, 17b, 17c restricting the friction member 15 from moving radially inwardly.

According to the aforementioned first to sixth and eighth embodiments, the guide portion 13b is the bent portion formed at the pressure plate 13, the bent portion being bent toward the lining plate 14 to be positioned at the radially inward side of the friction member 15.

According to the aforementioned seventh embodiment, the guide portion 14f is the stepped portion formed at the lining plate 14 to be positioned at the radially inward side of the friction member 15.

According to the aforementioned ninth embodiment, the guide portion 33 is arranged between the pressure plate 13 and the lining plate 14 to be positioned at the radially inward side of the friction member 15. The guide portion 33 serves as the guide member 33 restricted from moving radially by the inner circumferential surface of the pressure plate 13.

According to the aforementioned tenth and eleventh embodiments, the torque fluctuation absorber 1 further includes the first side plate 17 arranged at the radially inward side of the friction member 15 and fixed to the lining plate 14. The first side plate 17 is a component of the damper portion 3 absorbing torque fluctuations by the elastic force. The guide portion 17b is the outer circumferential end surface of the first side plate 17.

According to the aforementioned twelfth embodiment, the torque fluctuation absorber 1 further includes the first side plate 17 arranged at the radially inward side of the friction member 15 and fixed to the lining plate 14. The first side plate 17 is a component of the damper portion 3 absorbing the torque fluctuations by the elastic force. The guide portion 17c is the bent portion of the outer circumferential end portion of the first side plate 17, the bent portion being bent toward the lining plate 14.

According to the aforementioned second to sixth embodiments, the torque fluctuation absorber 1 further includes the guide portion 11c, 14c, 31b, 14e restricting the friction member 16 from moving radially outwardly.

According to the aforementioned second and fifth embodiments, the guide portion 11c is the stepped section formed at the cover plate 11 to be positioned at the radially outward side of the friction member 16.

According to the aforementioned third, fourth, and sixth embodiments, the guide portion 14c, 31b, 14e is the bent portion formed at the lining plate 14, the bent portion being bent toward the cover plate 11 to be positioned at the radially outward side of the friction member 16.

According to the aforementioned second to sixth embodiments, the torque fluctuation absorber 1 further includes the guide portion 13c, 14b, 30b, 14d restricting the friction member 15 from moving radially outwardly.

According to the aforementioned configuration of the torque fluctuation absorber 1 of the aforementioned embodiments, even in a case where the surfaces of the friction member 16 in the limiter portion 2 are configured to be slidable, the guide portion 11b, 14g, 34, 18b, 18c is arranged at the radially inward side of the friction member 16. Accordingly, the friction member 16 may be restricted from extending radially inwardly beyond an area defined between the cover plate 11 and the lining plate 14. Moreover, according to the aforementioned configuration of the torque fluctuation absorber 1, even in a case where the friction member 16 is configured to extend radially inwardly beyond the area defined between the cover plate 11 and the lining plate 14, the friction member 16 may be maintained to extend radially inwardly beyond the area. The characteristics of the limiter portion 2 may be stably maintained. In addition, the surfaces of the friction member 16 are configured to be slidable as described above; therefore, a manufacturing process for holding (fixing) the friction member 16 is unnecessary.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
a first plate member which is rotatable;
a second plate member axially separated from the first plate member, the second plate member being rotatable relative to the first plate member;
a first friction member arranged between the first plate member and the second plate member and slidably pressed against the first plate member and the second plate member;
a first guide portion formed at the first plate member and positioned at a radially inward side of the first friction member, the first guide portion restricting the first friction member from moving radially inwardly; and
a third guide portion formed at the second plate member and positioned at a radially outward side of the first friction member, the third guide portion restricting the first friction member from moving radially outwardly.

2. The torque fluctuation absorber according to claim 1, wherein the first guide portion is a bent portion of the first plate member, the bent portion being bent toward the second plate member so that the bent portion is positioned at a radially inward side of the first friction member.

3. The torque fluctuation absorber according to claim 1, wherein the third guide portion restricts the first friction member from moving radially outwardly.

4. The torque fluctuation absorber according to claim 1, wherein the first guide portion is continuously circumferentially formed at the first plate member.

5. The torque fluctuation absorber according to claim 1, wherein the first guide portion is partially circumferentially formed at the first plate member.

6. The torque fluctuation absorber according to claim 1, wherein the third guide portion is continuously circumferentially formed at the second plate member.

7. The torque fluctuation absorber according to claim 1, wherein the third guide portion is partially circumferentially formed at the second plate member.

8. The torque fluctuation absorber according to claim 1, further comprising
a fourth plate member positioned at a side of the second plate member axially opposite from the first plate member and axially separated from the second plate member, the fourth plate member being integrally rotatable with the first plate member and rotatable relative to the second plate member;
a second friction member arranged between the fourth plate member and the second plate member and slidably pressed against the fourth plate member and the second plate member; and
a second guide portion restricting the second friction member from moving radially inwardly.

9. A torque fluctuation absorber, comprising:
a first plate member which is rotatable;
a second plate member axially separated from the first plate member, the second plate member being rotatable relative to the first plate member;

a first friction member arranged between the first plate member and the second plate member and slidably pressed against the first plate member and the second plate member;

a first guide portion formed at the first plate member and positioned at a radially inward side of the first friction member, the first guide portion restricting the first friction member from moving radially inwardly;

a fourth plate member positioned at a side of the second plate member axially opposite from the first plate member and axially separated from the second plate member, the fourth plate member being integrally rotatable with the first plate member and being rotatable relative to the second plate member;

a second friction member arranged between the second plate member and the fourth plate member and slidably pressed against the second plate member and the fourth plate member;

a second guide portion formed at the second plate member and restricting the second friction member from moving radially inwardly or radially outwardly; and a third guide portion positioned at a radially outward side of the first friction member.

10. The torque fluctuation absorber according to claim 9, wherein the first guide portion is a bent portion of the first plate member, the bent portion being bent toward the second plate member so that the bent portion is positioned at a radially inward side of the first friction member.

11. The torque fluctuation absorber according to claim 9, wherein the second guide portion is a stepped portion of the second plate member, the stepped portion being positioned at a radially inward side of the second friction member.

12. The torque fluctuation absorber according to claim 9, wherein a fourth guide portion is continuously circumferentially formed at the second plate member.

13. The torque fluctuation absorber according to claim 9, wherein a fourth guide portion is partially circumferentially formed at the second plate member.

14. The torque fluctuation absorber according to claim 9, wherein the third guide portion is formed at the second plate member and restricts the first friction member from moving radially outwardly.

15. A torque fluctuation absorber, comprising:

a first plate member which is rotatable;

a second plate member axially separated from the first plate member, the second plate member being rotatable relative to the first plate member;

a first friction member arranged between the first plate member and the second plate member and slidably pressed against the first plate member and the second plate member;

a first guide portion formed at the second plate member and positioned at a radially inward side of the first friction member, the first guide portion restricting the first friction member from moving radially inwardly;

a fourth plate member positioned at a side of the second plate member axially opposite from the first plate member and axially separated from the second plate member, the fourth plate member being integrally rotatable with the first plate member and rotatable relative to the second plate member;

a second friction member arranged between the second plate member and the fourth plate member and slidably pressed against the second plate member and the fourth plate member; and a second guide portion formed at the fourth plate member and positioned at a radially inward side of the second friction member, the second guide portion restricting the second friction member from moving radially inwardly.

* * * * *